United States Patent
Marks et al.

(10) Patent No.: US 7,523,272 B2
(45) Date of Patent: Apr. 21, 2009

(54) SYSTEM AND METHOD FOR IDENTIFYING A STORAGE DRIVE IN A STORAGE NETWORK

(75) Inventors: Kevin T. Marks, Round Rock, TX (US); Farzad Khosrowpour, Pflugerville, TX (US); John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 331 days.

(21) Appl. No.: 10/889,563

(22) Filed: Jul. 12, 2004

(65) Prior Publication Data

US 2006/0010288 A1 Jan. 12, 2006

(51) Int. Cl.
*G06F 12/00* (2006.01)
(52) U.S. Cl. ........................ 711/154; 711/156
(58) Field of Classification Search ........................ None
See application file for complete search history.

(56) References Cited

U.S. PATENT DOCUMENTS

| | | | | |
|---|---|---|---|---|
| 5,878,270 A | * | 3/1999 | Kobayashi | 710/1 |
| 6,915,381 B2 | * | 7/2005 | Fujie et al. | 711/114 |
| 7,013,336 B1 | * | 3/2006 | King | 709/224 |
| 7,058,749 B2 | | 6/2006 | Loffink | 710/313 |
| 2004/0117517 A1 | * | 6/2004 | Beauchamp et al. | 710/16 |
| 2004/0117522 A1 | | 6/2004 | Loffink et al. | 710/74 |
| 2005/0138191 A1 | * | 6/2005 | Seto et al. | 709/230 |
| 2005/0154826 A1 | | 7/2005 | Marks et al. | 711/114 |
| 2005/0165786 A1 | | 7/2005 | Ahmed et al. | 707/10 |
| 2005/0210318 A1 | | 9/2005 | Marks et al. | 714/7 |
| 2005/0216604 A1 | | 9/2005 | Loffink et al. | 710/3 |
| 2005/0289386 A1 | | 12/2005 | Tawil et al. | 714/6 |

* cited by examiner

*Primary Examiner*—Hyung S Sough
*Assistant Examiner*—Ngoc V Dinh
(74) *Attorney, Agent, or Firm*—Baker Botts L.L.P.

(57) ABSTRACT

A system and method is disclosed for identifying the storage drives of a computer network. An identifier associated with an element of the storage network is stored in nonvolatile memory and later retrieved. The identifier associates the elements of the storage network, allowing the storage drives of the storage enclosure to be associated with the storage enclosure itself.

16 Claims, 5 Drawing Sheets

| Byte\Bit | 7 | 6 | 5 | 4 | 3 | 2 | 1 | 0 |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 7 | | | | | | | | |
| 8 | | | | | | | | |
| 9 | | | | | | | | |
| 10 | | | | | | | | |
| 11 | | | | | | | | |
| 12 | (MSB) | | | VENDOR IDENTIFICATION | | | | |
| 19 | | | | | | | | (LSB) |
| 20 | (MSB) | | | PRODUCT IDENTIFICATION | | | | |
| 35 | | | | | | | | (LSB) |
| 36 | (MSB) | | | PRODUCT REVISION LEVEL | | | | |
| 39 | | | | | | | | (LSB) |
| 40 | | | | STORAGE CONTROLLER SERIAL NUMBER | | | | |
| 59 | | | | | | | | |
| 60 | (MSB) | | | | | | | |
| 63 | | | | | | | | (LSB) |

SYSTEM AND METHOD FOR IDENTIFYING A STORAGE DRIVE IN A STORAGE NETWORK

TECHNICAL FIELD

The present disclosure relates generally to the field of computer networks, and, more particularly, to a system and method for identifying the location of a storage drive in a storage network.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be included as elements of a storage network. A storage network can be considered as a specialized network of storage devices coupled to one or more data servers. A storage enclosure is an element of a storage network. A storage enclosure is a self-contained physical enclosure that includes within the enclosure a number of storage elements or storage drives. Storage drives typically comprise disk-based hard storage drives. Serial Attached SCSI (SAS) is a storage network interface and communications protocol for storage transactions. Serial Attached SCSI is characterized by storage networks having a serial, point-to-point architecture and improved data integrity, as compared with parallel SCSI storage networks.

In present storage networks, each SAS storage drive port is assigned an identifier. This identifier is unique to and permanently assigned to the storage drive's port. The storage drive's port identifier is associated with the storage drive and is not assigned with reference to the storage slot of the storage drive or the storage enclosure that houses the storage drive. Similarly, the storage drive's identifier does not include an indication of the storage location of the storage drive, including any indication of the storage enclosure that includes the storage drive or the enclosure interface controller or controllers that are coupled to the storage drive. Because of the complex topology of SAS storage networks, considerable difficulty exists in identifying the specific SAS storage drives that are controlled by an enclosure interface controller or physically located within a storage enclosure of the storage network.

SUMMARY

In accordance with the present disclosure, a system and method is disclosed for identifying the storage drives of a computer network and correlating those storage drives with other elements of the storage network. A unique identifier for the enclosure interface controller of the storage enclosure is saved to a nonvolatile memory location associated with the storage enclosure. Following the issuance of a command, this identifier is retrieved. Once retrieved, a unique identifier for enclosure interface controller can be used to associated the enclosure interface controller, the storage enclosure, and storage drives of the network that are coupled to the controller, thereby enabling the storage drives of the storage network to be associated with the storage enclosure and enclosure interface controller of the network. Once retrieved, a unique identifier for a storage enclosure can be used to associate the enclosure interface controller, storage enclosure, and storage drives, thereby enabling the storage drives of the storage network to be associated with the storage enclosure and enclosure interface controller of the network.

The system and method disclosed herein is advantageous because it provides a technique for associating the storage drives of a storage enclosure with the other elements of the storage enclosure, including the enclosure interface controllers associated with the storage drive, the expanders associated with the storage drive and the storage enclosure, and the storage enclosure itself, which houses the storage drives. The system and method disclosed herein eliminates the difficulty of associating storage drives with a storage enclosure in a storage network having a complex architecture or topology. The system and method disclosed herein is also advantageous in that it permits the display of a diagram of the architecture or topology of a storage network in which the network elements other than the enclosures and the storage drives are abstracted from and not depicted in the topological diagram. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a diagram of a data structure of the response of a software command.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk storage drives, one or more network ports for communication with external devices as well as various input and output (I/O) devices, such as a keyboard, a mouse, and a video display. The information handling system may also include one or more buses operable to transmit communications between the various hardware components.

Figure 1:
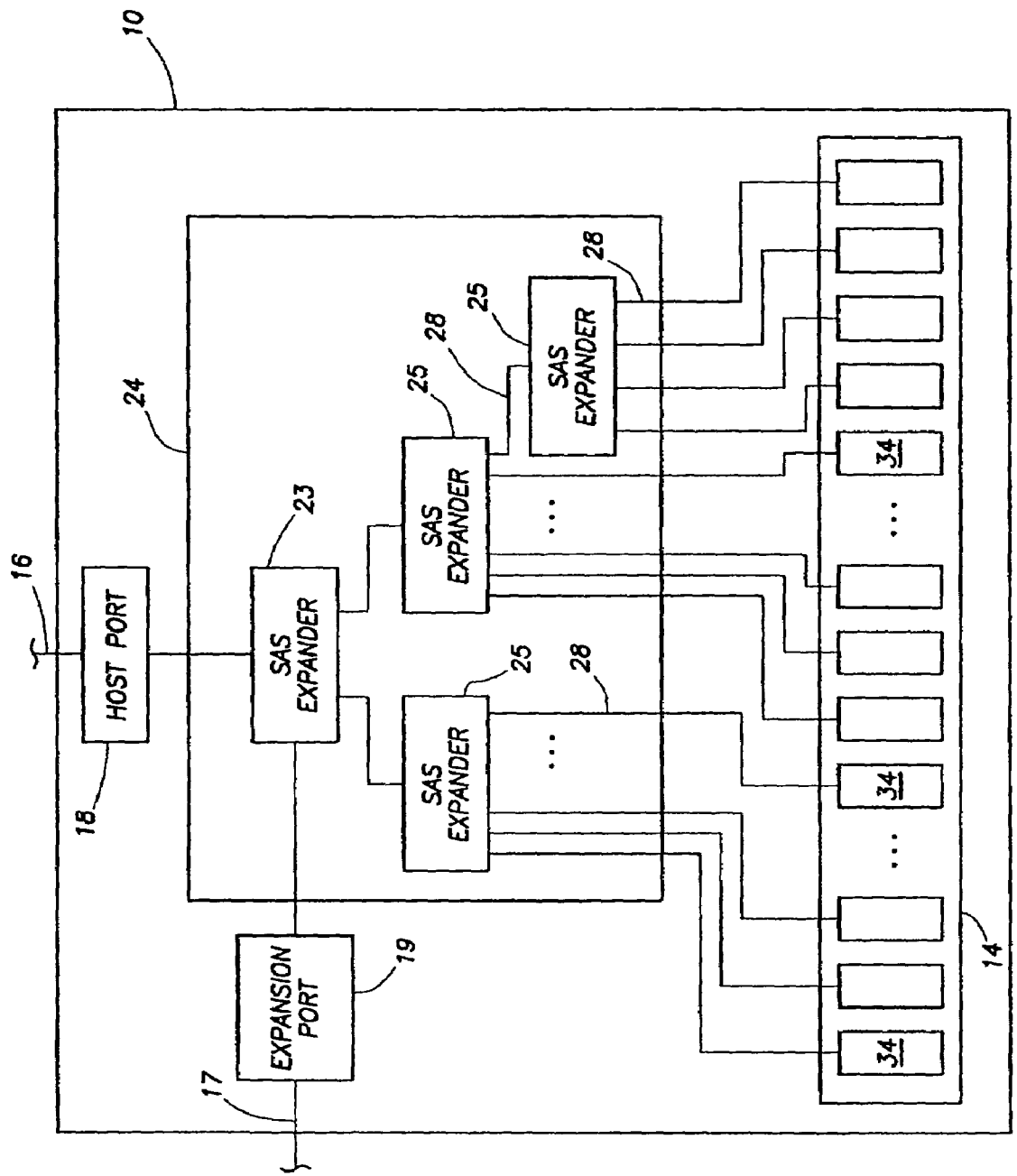
FIG. 1 is a block diagram of a storage enclosure.

The present disclosure relates to a system and method for correlating the storage drives of a storage network, including a Serial Attached SCSI network, to other elements of the network, such as the expander, enclosure interface controller, and storage enclosure of the storage network. Associating a storage drive with one or more elements of the storage network assists with the management of the storage drives and the storage network as a whole. FIG. 1 is a simplified block diagram of a storage enclosure 10. Storage enclosure 10 includes an expander 23 in the form of a fan-out expander that is coupled to two edge expanders 25. One of the two edge expanders 25 is in turn is coupled to another edge expander 25. Storage enclosure 10 includes a backplane 14 that is coupled to a number of SAS or SATA storage drives 34. Each of the SAS or SATA storage drives 34 is coupled to one of the expanders 25 through a single point-to-point connection 28. Expander 23 is coupled to a host port 18 and an expansion port 19. Host port is coupled to a host connection 16, and expansion port 19 is coupled to an expansion connection 17.

Figure 2:
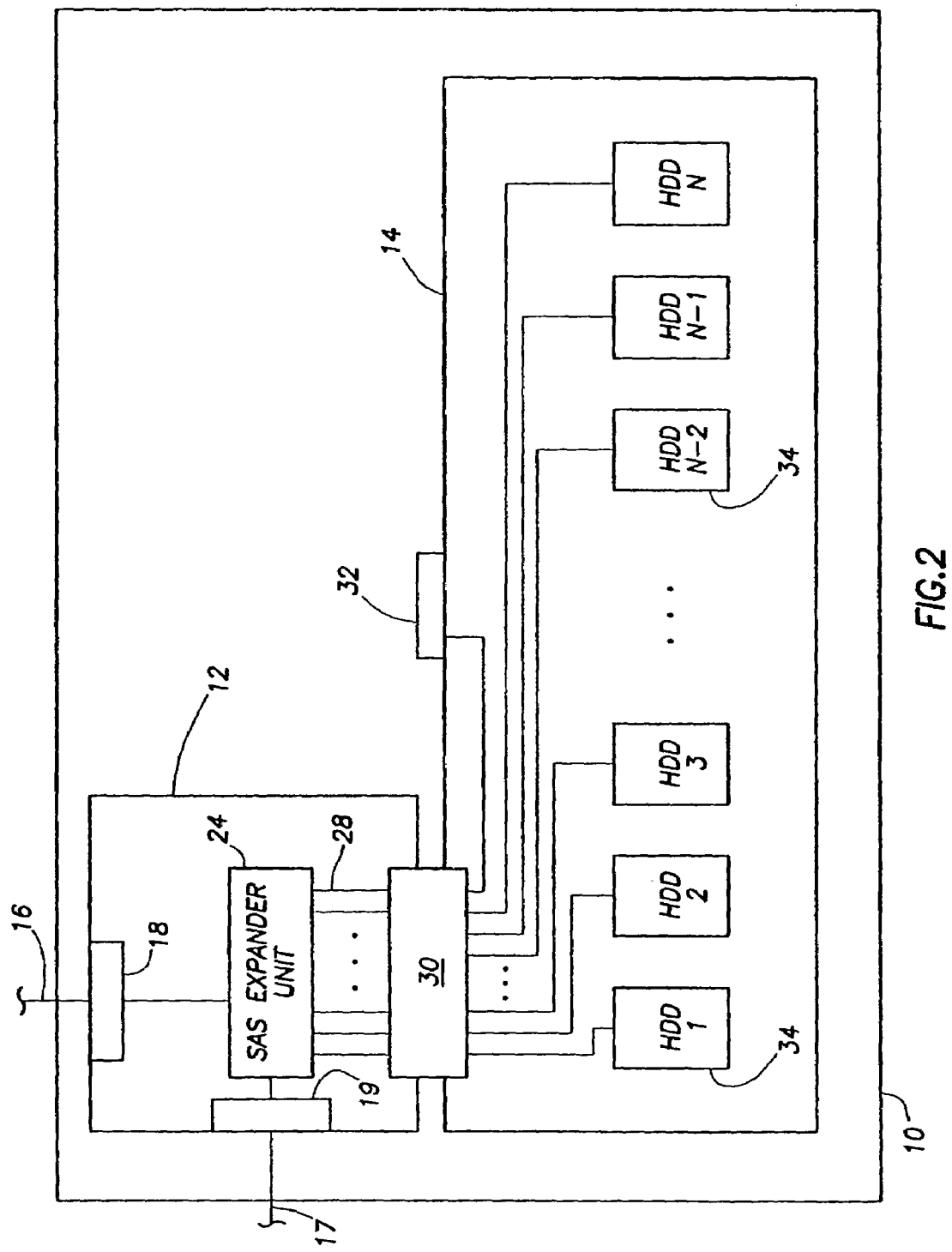
FIG. 2 is a block diagram of a storage enclosure with a single enclosure interface controller.

Shown in FIG. 2 is a second block diagram of a storage enclosure 10. In the block diagram of FIG. 2, the SAS expanders of FIG. 1 are not shown in detail, but are instead represented within the SAS expander unit or block 24. Expander block is coupled to a host port 18 and an expansion port 19. Host port 18 is coupled to a host connection 16, and expansion port 19 is coupled to an expansion connection 17. Expander unit 24, host port 18, and expansion port 19 comprise enclosure interface controller 12. SAS expander unit 24 is coupled to a plurality of point-to-point connections 28, each of which is coupled to a connector device 30. Connector device 30 is a high speed connector that serves as routing interface between enclosure interface controller 12 and the SAS or SATA storage drives 34 of backplane 14. Storage drives 34 may comprise SAS drives or SATA drives that are coupled with a port selector.

Figure 3:
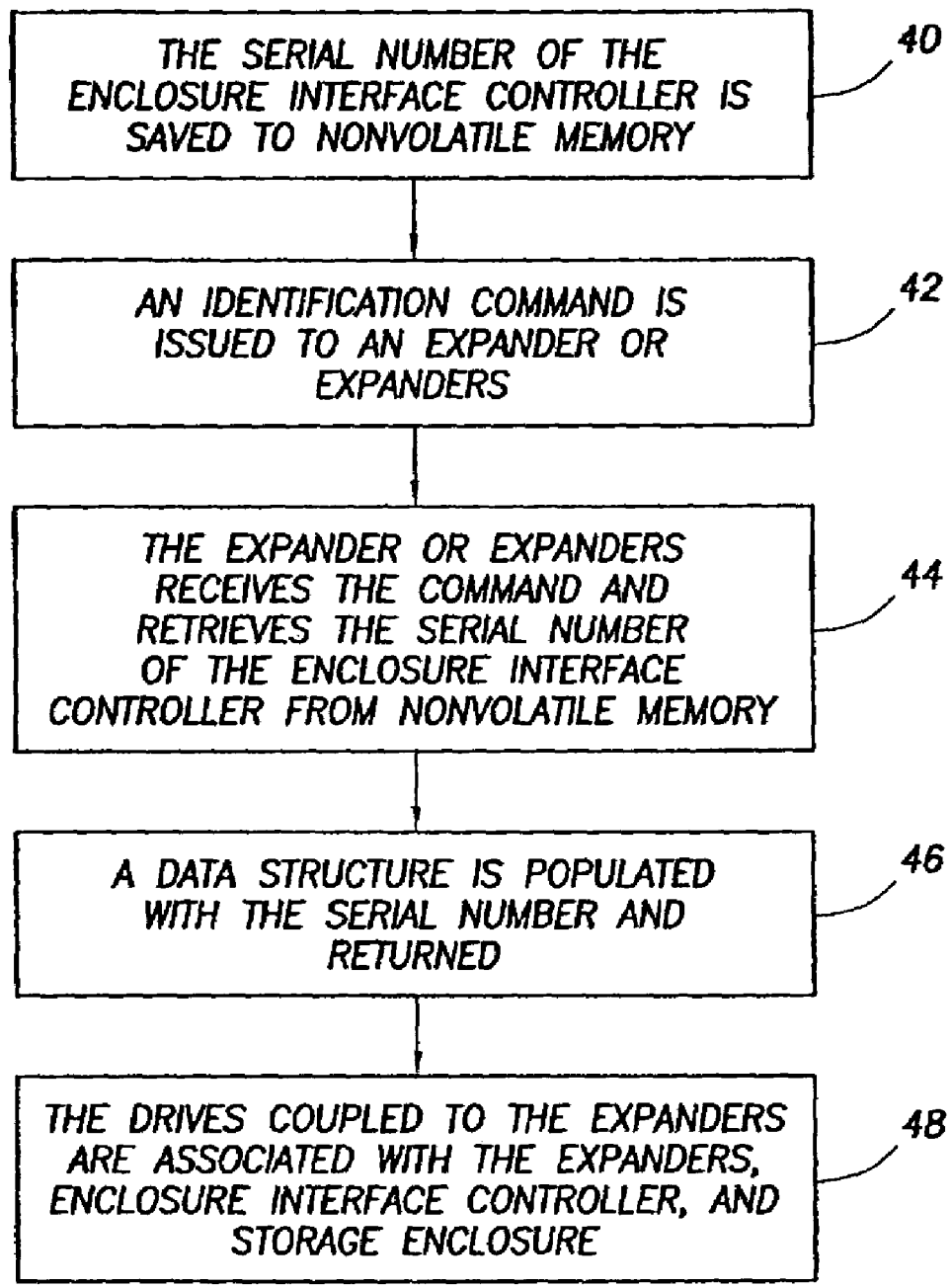
FIG. 3 is a flow diagram of method steps for retrieving storage drive identification information for each of the storage drives of the storage enclosure and correlating that information with the components of the storage enclosure.

Shown in FIG. 3 are a series of method steps for retrieving storage drive identification information for each of the storage drives of the storage enclosure and correlating that information with the expander, enclosure interface controller, and storage enclosure associated with the storage drive or storage drives. As a preliminary step of the flow diagram of step 40, the serial number of enclosure interface controller 12 is saved to the non-volatile memory 32 of the storage enclosure. The serial number of the enclosure interface controller is saved to non-volatile memory so that, during the power-up or initialization of each expander of the storage enclosure, each expander may access and retrieve the serial number of the enclosure interface controller on which the expander resides. Because of this configuration, a unique serial number associated with the enclosure interface controller is saved to a memory location that is accessible by each expander. At step 42, a command is issued from a storage controller associated with a server to each expander or expanders in the storage enclosure. If a storage enclosure includes multiple expanders, each expander will receive the command. The issued command is an identification command that will query and return to the source of the command data concerning each expander of the enclosure. One example of a suitable identification command is SAS's SMP command, Report Manufacturer Information, which includes at least one otherwise blank data field that is designated as vendor-specific data and which may be configured in conformance with teaching of the storage drive correlation method disclosed herein.

Following the issuance of the identification command, the expander or expanders of the storage enclosure receive the command at step 44 and retrieve the serial number of the enclosure interface controller from nonvolatile memory. At step 46, a data structure is populated with the serial number of the enclosure interface controller. An example of a suitable data structure that is provided in response to a software command is disclosed in FIG. 4. As indicated in FIG. 4, bytes 12-19 of the data structure 50 are populated with a vendor identification number associated with the expander. Bytes 20-35 are populated with a product identification code associated with the expander, and bytes 36-49 are associated with revision level of the expander. Bytes 40-59 of data structure 50 are populated with the serial number of the enclosure interface controller. In the data structure that is returned by the Report Manufacturer Information command, bytes 40-59 are otherwise not used and are configurable by the user or vendor of the storage network. At step 46, data structure 50 is returned to the source of the command. Once the data structure has been received at its source, which could comprise a management application of the storage network, the correlation of an expander with a specific serial number allows the user to correlate the storage drives of the storage enclosure with other elements of the storage enclosure. As indicated in step 48, the user may issue a command that would identify all those storage drives associated with each expander. The data returned by this command would result in the correlation of those storage drives to an enclosure interface controller. The correlation of storage drives to an enclosure interface controller is possible because each expander can be separately queried for an identification of the storage drives coupled to the expander, thereby provide an association between the storage drives coupled to the expander and the unique serial number of the enclosure interface controller. In addition, because each enclosure interface controller is associated with a storage enclosure, the association of storage drives to an enclosure interface controller further allows the correlation of storage drives to a specific, physical storage enclosure.

Figure 5:
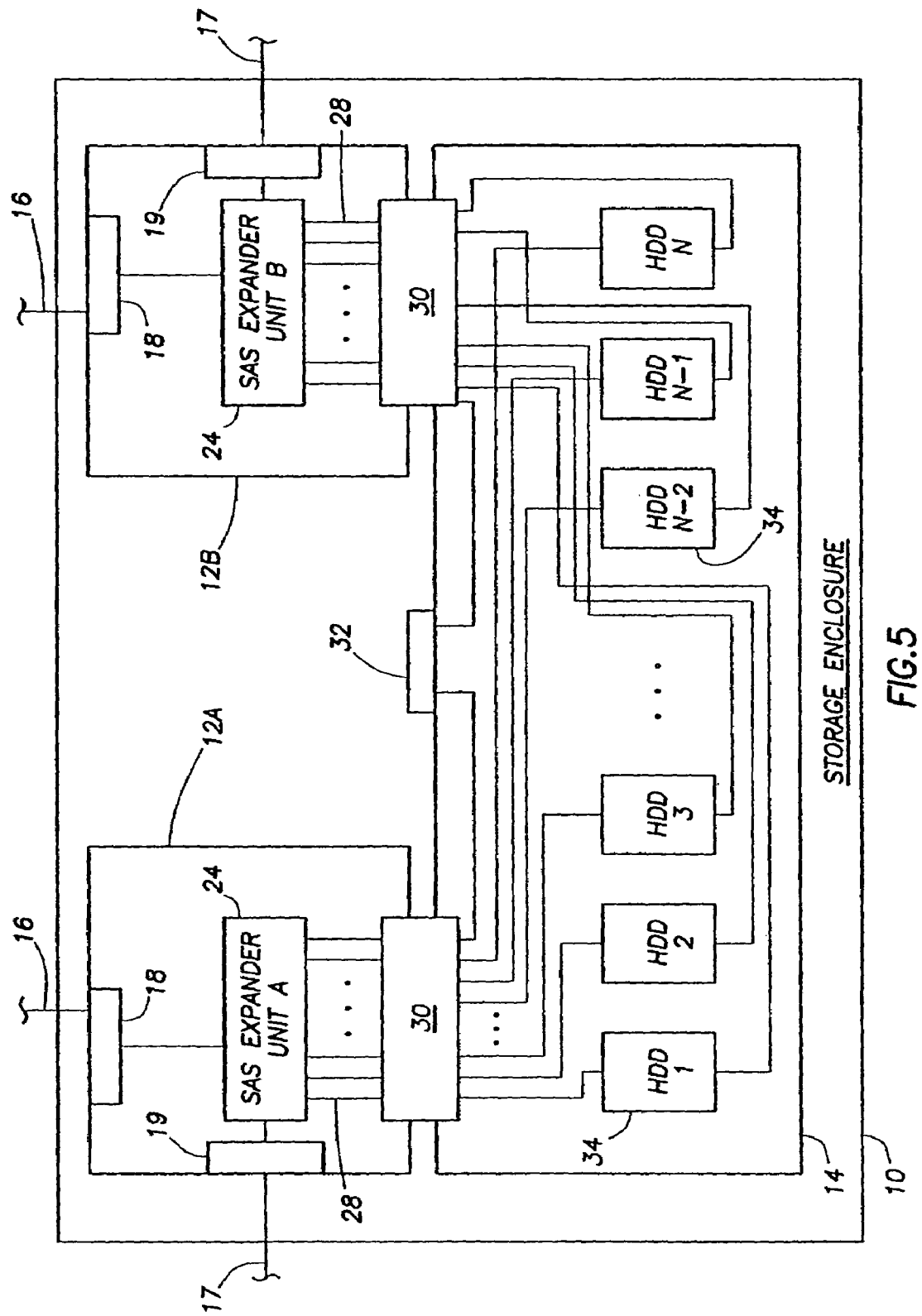
FIG. 5 is a block diagram of a storage enclosure with two enclosure interface controllers.

A single storage enclosure may include more than one enclosure interface controller. An example of this configuration is shown in FIG. 5. Storage enclosure 10 of FIG. 5 includes first and second enclosure interface controllers, labeled 12A and 12B. Storage drives 34 may comprise SAS drives or SATA drives that are coupled with a port selector. Each SAS storage drive and each SATA storage drive with a port selector has dual ports, allowing each of the SAS storage drive and each SATA storage drive (with a port selector) to be coupled to enclosure interface controller 12A and to enclosure interface controller 12B. In the configuration of FIG. 5, a serial number for the storage enclosure is saved to the nonvolatile memory 32 of the storage enclosure. An identification command is issued to the expanders of the storage enclosure. The identification command can be any suitable command that returns identification information concerning the elements of the storage enclosure. As described above with respect to the flow diagram of FIG. 3 and the data structure of FIG. 4, the method described herein may populate an unused location in an existing data structure of a known identification command. Following the receipt of the identification command, each of the expanders retrieve from nonvolatile memory the identifier associated with the storage enclosure. A data structure is populated with the identifier retrieved from nonvolatile memory and the data structure is returned to the source of the command, which may be a management application or other user of the storage network. Once the data structure has been received at its source, the expanders of the storage enclosure are correlated with the storage enclosure. The user may then issue subsequent commands that would permit the user to identify all those storage drives associated with the expanders, thereby associating those storage drives with the storage enclosure.

The disclosed method provides a technique for correlating the storage drives of a storage enclosure to the expanders and enclosure interface controllers of the storage enclosure, and to the storage enclosure itself. Storage networks may be expanded by coupling storage enclosures through their expansion ports. In the case of an expanded storage network, in which multiple storage enclosures are coupled in a managed configuration, the ability to correlate storage drives with elements of a storage enclosure, including the storage enclosure itself, is especially useful. With the use of this methodology, the management application of an expanded storage network can physically locate and identify the storage drives of the network and associate those storage drives with other physical elements of the network. Once the correlation between storage drives and storage enclosures is known, a simplified diagram of the topology of the storage drives and enclosures can be presented. A topology diagram of this sort, in which the expander layout and architecture of the storage network is abstracted out of the architectural diagram, allows for the simplified presentation of visual information concerning the location of storage drives with reference to the storage enclosures that house the storage drives. Although the present disclosure has been described in detail, it should be understood that various changes, substitutions, and alterations can be made hereto without departing from the spirit and the scope of the invention as defined by the appended claims.

What is claimed is:

1. A method for correlating a storage enclosure with storage drives of the storage enclosure, comprising the steps of:
saving to a storage location an identifier associated with an enclosure interface controller, wherein the storage location is accessible by each expander;
issuing a command to cause the identifier to be retrieved from the storage location, wherein the step of issuing a command to cause the identifier to be retrieved from the storage location further comprises the step of issuing a command to an expander to cause the expander to retrieve the identifier from the storage location, and wherein the step of issuing a command to the expander to cause the expander to retrieve the identifier from the storage location further comprises the step of populating an unused location on a data structure associated with an existing data management command;
identifying the expander based, at least in part, on the identifier;
issuing a command to associate the expander with the storage enclosure; and
issuing a command to associate the expander with the drives in communication with the expander.

2. The method for correlating a storage enclosure with the storage drives of the storage enclosure of claim 1, wherein the storage location is nonvolatile memory associated with the storage enclosure.

3. The method for correlating a storage enclosure with the storage drives of the storage enclosure of claim 1, wherein the identifier is a serial number of the enclosure interface controller.

4. The method for correlating a storage enclosure with the storage drives of the storage enclosure of claim 1, wherein the step of issuing a command to the expander to cause the expander to retrieve the identifier from the storage location further comprises the step of populating an unused location on a data structure associated with a Serial Management Protocol Report Manufacturer Information command.

5. The method for correlating a storage enclosure with the storage drives of the storage enclosure of claim 1,
wherein the storage location is a nonvolatile memory associated with the storage enclosure;
wherein the identifier is a serial number of the enclosure interface controller;
wherein the step of issuing a command to cause the identifier to be retrieved from the storage location further comprises the step of:
issuing a command to the expander to cause the expander to retrieve the identifier from the storage location; and
populating an unused location on a data structure associated with a Serial Management Protocol Report Manufacturer Information command.

6. The method for correlating a storage enclosure with the storage drives of the storage enclosure of claim 1, wherein the expander is a Serial Attached SCSI (SAS) expander.

7. A method for correlating the drives of a storage enclosure with the storage enclosure, comprising the steps of:
saving to a storage location an identifier for the storage enclosure, wherein the storage location is accessible by each expander;
issuing a command to cause the identifier to be retrieved from the storage location, wherein the step of issuing a command to cause the identifier to be retrieved from the storage location further comprises the step of issuing a command to an expander to cause the expander to retrieve the identifier from the storage location, and wherein the step of issuing a command to the expander to cause the expander to retrieve the identifier from the storage location further comprises the step of populating an unused location on a data structure associated with an existing data management command;
identifying the expander based, at least in part, on the identifier;
issuing a command to associate the expander with the storage enclosure; and
issuing a command to associate the expander with the drives in communication with the expander.

8. A method for correlating the drives of a storage enclosure with the storage enclosure of claim 7, wherein the storage location is a nonvolatile memory associated with the storage enclosure.

9. A method for correlating the drives of a storage enclosure with the storage enclosure of claim 7, wherein the identifier is a serial number of the storage enclosure.

10. A method for correlating the drives of a storage enclosure with the storage enclosure of claim 7,
wherein the storage location is a nonvolatile memory associated with the storage enclosure;

wherein the step of issuing a command to cause the identifier to be retrieved from the storage location further comprises the step of:

issuing a command to the expander to cause the expander to retrieve a identifier from the storage location; and populating an unused location on a data structure associated with a Serial Management Protocol Report Manufacturer Information command.

11. A method for correlating the drives of a storage enclosure with the storage enclosure of claim 10, wherein the identifier is a serial number of the storage enclosure.

12. A method for correlating an enclosure interface controller with storage drives of a storage enclosure, comprising the steps of:

saving to a storage location an identifier associated with an expander of the storage enclosure, wherein the storage location is accessible by the expander;

issuing a command to cause the identifier to be retrieved from the storage location, wherein the step of issuing a command to cause the identifier to be retrieved from the storage location further comprises the step of issuing a command to the expander to cause the expander to retrieve the identifier from the storage location, and wherein the step of issuing a command to the expander to cause the expander to retrieve the identifier from the storage location further comprises the step of populating an unused location on a data structure associated with an existing data management command;

identifying the expander based, at least in part, on the identifier;

issuing a command to associate the expander with the enclosure interface controller in communication with the expander; and issuing a command to associate the expander with the drives in communication with the expander.

13. The method for correlating an enclosure interface controller with the storage drives of a storage enclosure of claim 12, wherein the storage location is a nonvolatile memory associated with the storage enclosure.

14. The method for correlating an enclosure interface controller with storage drives of a storage enclosure of claim 12, wherein the step of issuing a command to the expander to cause the expander to retrieve the identifier from the storage location further comprises the step of populating an unused location on a data structure associated with a Serial Management Protocol Report Manufacturer Information command.

15. The method for correlating an enclosure interface controller with the storage drives of a storage enclosure of claim 12, wherein the storage location is a nonvolatile memory associated with the storage enclosure;

wherein the step of issuing a command to cause the identifier to be retrieved from the storage location further comprises the step of:

issuing a command to the expander to cause the expander to retrieve the identifier from the storage location; and populating an unused location on a data structure associated with a Serial Management Protocol Report Manufacturer Information command.

16. The method for correlating an enclosure interface controller with the storage drives of a storage enclosure of claim 12, wherein the expander is a Serial Attached SCSI (SAS) expander.

* * * * *